T. L. BURTON.
BRAKE MECHANISM.
APPLICATION FILED JUNE 12, 1918.
1,364,072.
Patented Jan. 4, 1921.
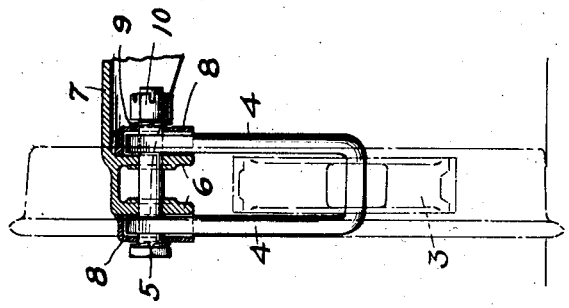
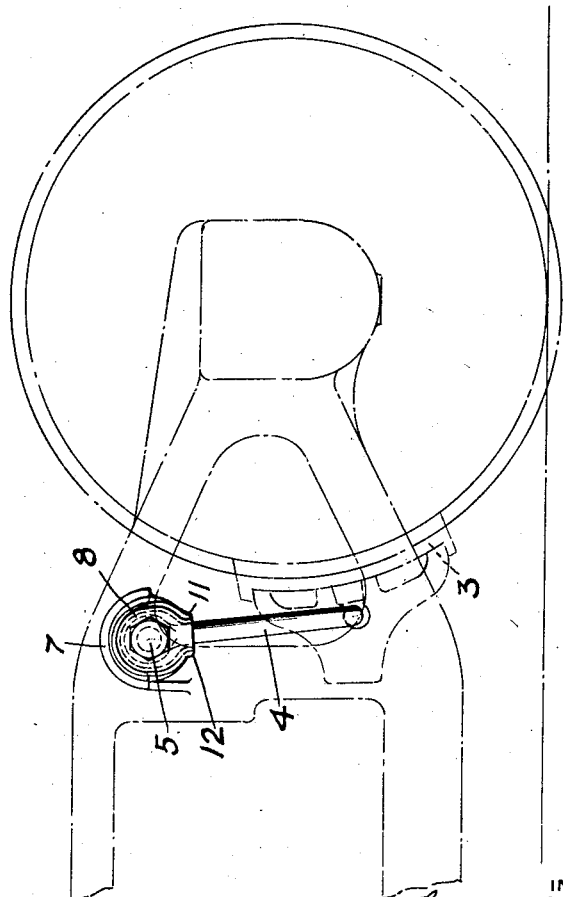
INVENTOR
Thomas L. Burton.
by Edward H. Wright.
Atty.

UNITED STATES PATENT OFFICE.

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

BRAKE MECHANISM.

1,364,072.  Specification of Letters Patent.  Patented Jan. 4, 1921.

Application filed June 12, 1918. Serial No. 239,510.

*To all whom it may concern:*

Be it known that I, THOMAS L. BURTON, a citizen of the United States, residing at St. Louis, in the State of Missouri, have invented certain new and useful Improvements in Brake Mechanism, of which improvements the following is a specification.

This invention relates to brake rigging for railway cars and has for its object to provide an improved hanger device for automatically adjusting the brake shoe clearance and maintaining the same substantially uniform and constant for all conditions of wear of the brake shoes and wheels.

Generally stated my improvement comprises a movable friction member adapted to be moved by the brake hanger in the application movement but having a frictional engagement with a fixed portion of the truck frame, and carrying a stop to limit the release movement of the hanger to the desired amount of brake shoe clearance.

In the accompanying drawing Figure 1 is a side elevation of one form of brake hanger device embodying my improvement; and Fig. 2 an end view of the same.

While my improvement is designed for use in connection with various forms of brake hangers I have illustrated the same in connection with a U-shaped type of hanger having a lower bar supporting a brake shoe 3, and two side bars 4, pivotally mounted at their upper ends by a pin 5, carried by the lugs 6, of the suspension bracket 7, of the truck frame. A friction member, one or more, such as the friction caps 8, are movably mounted, preferably on the pivot pin 5, and have frictional engagement with the truck frame by means of the friction washer 9, and nut 10, carried by the bolt 5. The friction member or cap has a portion 11, adapted to be engaged by the hanger in its forward or application movement, and another stop lug or portion 12, adapted to limit the release movement of the hanger. The opening at the bottom of the caps between the parts 11, and 12, is larger than the thickness of the hanger bars by an amount equal to the desired clearance, that is, sufficient to permit the proper amount of release movement of the hanger to produce the desired brake shoe clearance.

Where an application of the brakes is made and the brake shoe is forced against the wheel the hanger swings forward and engages the part 11 of the friction caps, overcoming the frictional resistance between the caps and the frame and moving said friction members or caps far enough to permit the full bearing of the shoe against the wheel. Then when the brake is released the hanger swings backward until it engages the stop lug 12, of the friction member or caps, which limits the release movement to that point since the frictional resistance between the cap and frame is sufficient to prevent further release movement of the hanger. As further wear of the brake shoe and wheel occurs, it will be seen that the friction member will be shifted forward at each application movement of the brake shoe and hanger an amount sufficient to compensate for such wear and that the clearance of the brake shoe from the wheel upon release of brakes will be maintained substantially uniform and constant.

What I claim is:

1. In a brake mechanism, the combination of a brake hanger pivotally connected to the truck frame, a movable member normally held against movement by frictional engagement with the truck frame but adapted to be shifted by the extreme forward movement of the hanger, and a stop carried by the movable member in the same plane with the hanger for limiting the release movement of the hanger.

2. In a brake mechanism, the combination of a brake hanger pivotally connected to the truck frame, a friction member pivoted on the frame and having frictional engagement therewith for normally preventing movement, said friction member having a part adapted to be engaged and shifted by the hanger in the extreme application movement, and a stop also carried by the friction member and adapted to engage the hanger for limiting the release movement of the same.

3. In a brake mechanism, the combination of a brake hanger pivotally connected to the truck frame, a friction member mounted on the same pivot with the hanger and having frictional engagement with the truck frame for normally preventing movement, said friction member having a part adapted to be engaged and shifted by the hanger in its extreme application movement, and a stop also carried by said friction member for limiting the release movement of the hanger.

4. In a brake mechanism the combination of a brake hanger, a friction member, a pivot pin mounted in the truck frame and extending through the hanger and friction member, a clamping nut carried by said bolt for producing frictional engagement between the friction member and the truck frame, and a stop carried by the friction member for limiting the movement of the hanger.

5. In a brake mechanism, the combination of a brake hanger pivotally connected to the truck frame, and a friction cap mounted on the same pivot with the hanger and inclosing its upper end, said cap having frictional engagement with the truck frame and an opening for the hanger of slightly greater width than the thickness of the hanger.

In testimony whereof I have hereunto set my hand.

THOMAS L. BURTON.